(12) United States Patent
Wurtenberger et al.

(10) Patent No.: US 9,319,900 B1
(45) Date of Patent: Apr. 19, 2016

(54) OPTIMIZATION OF CELL TOWER FUNCTIONALITY ON HIGH CAPACITY SITES

(71) Applicant: Sprint Communications Company L.P., Overland Park, KS (US)

(72) Inventors: Andrew M. Wurtenberger, Olathe, KS (US); Gauravpuri Amrutpuri Goswami, Overland Park, KS (US); Sreekar Marupaduga, Overland Park, KS (US)

(73) Assignee: Sprint Communications Company L.P., Overland Park, KS (US)

(*) Notice: Subject to any disclaimer, the term of this patent is extended or adjusted under 35 U.S.C. 154(b) by 92 days.

(21) Appl. No.: 14/107,995

(22) Filed: Dec. 16, 2013

(51) Int. Cl.
*H04M 1/00* (2006.01)
*H04W 24/02* (2009.01)
*H04W 72/08* (2009.01)

(52) U.S. Cl.
CPC ............ *H04W 24/02* (2013.01); *H04W 72/085* (2013.01)

(58) Field of Classification Search
USPC .................. 455/550.1, 552.1, 561, 562.1
See application file for complete search history.

(56) References Cited

U.S. PATENT DOCUMENTS

| | | | |
|---|---|---|---|
| 6,801,788 B1 * | 10/2004 | Csapo et al. .................. | 455/561 |
| 8,682,392 B2 * | 3/2014 | Gelbman et al. .............. | 455/561 |
| 2004/0087279 A1 * | 5/2004 | Muschallik et al. ............ | 455/73 |
| 2010/0296816 A1 * | 11/2010 | Larsen .......................... | 398/116 |
| 2013/0077966 A1 * | 3/2013 | Gelbman et al. ................ | 398/43 |
| 2015/0092708 A1 * | 4/2015 | Su et al. ........................ | 370/329 |

* cited by examiner

*Primary Examiner* — Fayyaz Alam

(57) ABSTRACT

Methods and systems are provided for optimization of the functionality of a radio tower comprising multiple radios. A baseband unit receives data on an uplink data transmission from a first radio but not from a second radio present at the radio tower. The baseband unit processes the data and transmits, on a downlink data transmission, the data to the first radio and to the second radio. Both radios may have a combined quantity of radio ports whose channels are combined by way of a combiner such that the quantity of channels become equivalent to the quantity of antenna ports on the antenna at the radio tower.

19 Claims, 4 Drawing Sheets

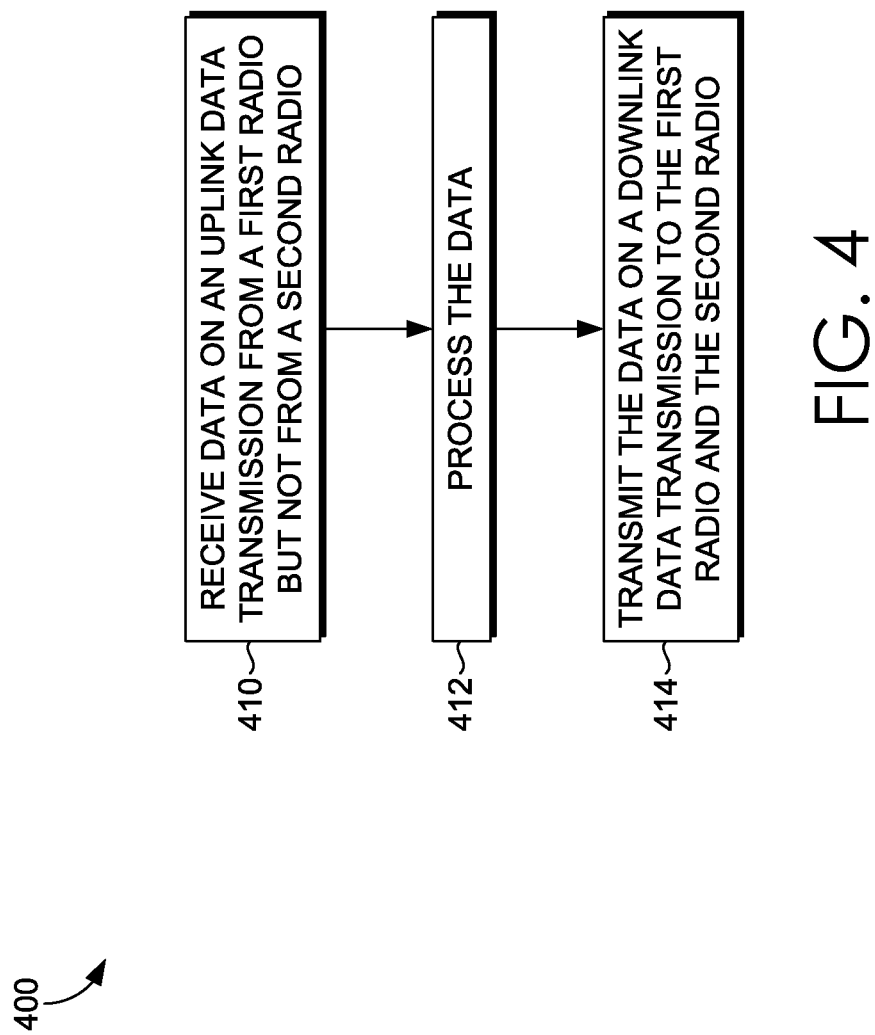

OPTIMIZATION OF CELL TOWER FUNCTIONALITY ON HIGH CAPACITY SITES

SUMMARY

A high level overview of various aspects of the invention is provided here for that reason, to provide an overview of the disclosure and to introduce a selection of concepts that are further described below in the detailed-description section. This summary is not intended to identify key features or essential features of the claimed subject matter, nor is it intended to be used as an aid in isolation to determine the scope of the claimed subject matter.

In brief, and at a high level, this disclosure describes, among other things, systems and methods for optimizing functionality of a radio tower having multiple radios. For instance, in one embodiment, two radios are utilized, each having four radio ports for a total of eight radio ports between the two radios. In this embodiment, the first radio may have both transmit and receive functionality, while the second radio has only transmit functionality. As explained herein, this provides for greater diversity, or a higher quantity of radio ports that are able to receive signals/data at any one time. When data on an uplink data transmission is received at a first radio, the first radio sends the data to one or more baseband units for data processing. Both the first radio and the second radio receive the processed data from one or more of the baseband units and transmit the data to mobile devices through the antenna on the radio tower. In embodiments, a combiner utilizing one or more guard bands is used when a quantity of radio ports is not equivalent to a quantity of antenna ports (e.g., eight radio ports and four antenna ports).

BRIEF DESCRIPTION OF THE DRAWINGS

Illustrative embodiments of the present invention are described in detail below with reference to the attached drawing figures, and wherein:

FIG. 4 depicts a flow diagram of an exemplary method for optimizing functionality of a radio tower comprising multiple radios, according to an embodiment of the technology.

DETAILED DESCRIPTION

Figure 1:
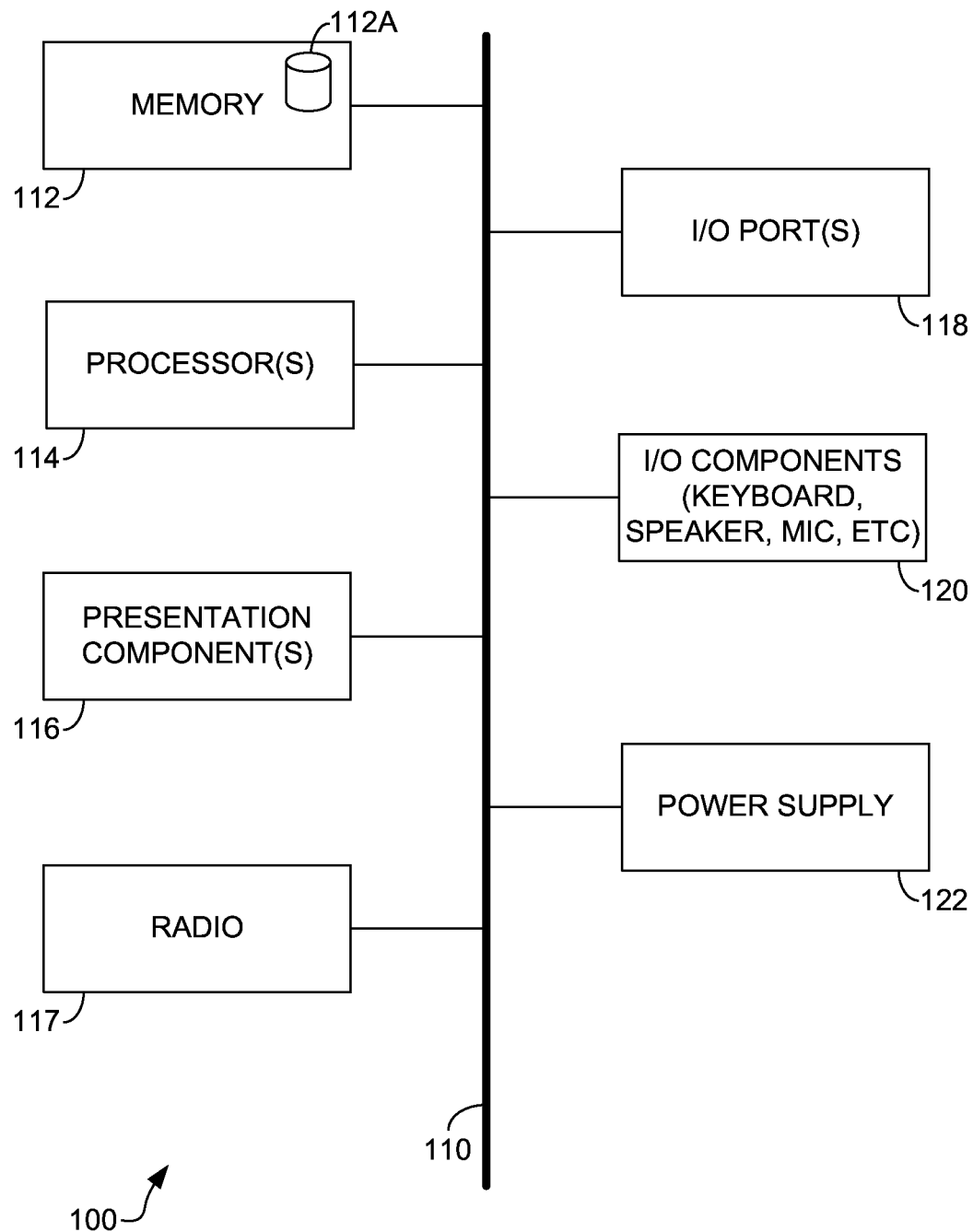
FIG. 1 depicts an exemplary mobile device according to an embodiment of the technology.

The subject matter of select embodiments of the present invention is described with specificity herein to meet statutory requirements. But the description itself is not intended to define what we regard as our invention, which is what the claims do. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:
BBU Baseband Unit
BS Base Station
CDMA Code Division Multiple Access
CPRI Common Public Radio Interface
eNodeB Evolved Node B
GPRS General Packet Radio Service
GSM Global System for Mobile Communications
LTE Long-Term Evolution
MIMO Multiple-Input-Multiple-Output
RF Radio-Frequency
RRU Remote Radio Unit
WCDMA Wideband Code Division Multiple Access Further, various technical terms are used throughout this description. An illustrative resource that fleshes out various aspects of these terms can be found in Newton's Telecom Dictionary, 27th Edition (2012).

Embodiments of our technology may be embodied as, among other things, a method, system, or computer-program product. Accordingly, the embodiments may take the form of a hardware embodiment, or an embodiment combining software and hardware. In one embodiment, the present invention takes the form of a computer-program product that includes computer-useable instructions embodied on one or more computer-readable media.

Computer-readable media include both volatile and non-volatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Embodiments of the present invention are directed toward increasing the diversity of receive functionality of one or more radios utilized at a radio tower. For instance, in the embodiment where more than one radio is used, receive diversity may be low or at least decreased when a combiner having one or more guard bands is used. A combiner may be used to combine signals from two neighboring frequency bands onto a common output port. For instance, if two radios are utilized on the radio tower and each radio has four ports, there would be eight total radio ports. Each of these radio ports is connected to the combiner, which combines or otherwise lessens the quantity of channels to match the number of ports on the antenna.

In one embodiment, the combiner includes a guard band that is used to achieve isolation between neighboring frequency bands, and as such works to avoid interference between the various frequency ranges being utilized. In one embodiment, multiple guard bands are used, such as one guard band in between each frequency range to avoid interference.

When multiple radios are utilized at a radio tower, one or more radios may have their receive functionality disabled, which may increase the diversity of the receive functionality by increasing the quantity of ports on the radios that are able to receive signals/data. As used herein, receive functionality is the ability of the radios or radio ports to receive signals/data from mobile devices through the antenna and combiner. The uplink data transmission is the path of data from mobile devices to the wireless communications network, such as the base station, whereas the downlink data transmission is the path of data from the wireless communications network back to the mobile devices. As will be described further herein, when guard bands are utilized at the combiner, not all of the radio ports may be receiving data at any one time, thus decreasing the receive diversity. Utilizing embodiments of the present invention, each of the four radio ports on one of the radios is able to receive data at any one time, while the other radio ports, such as on a second radio, do not receive data (e.g., receive from the antenna and combiner).

Accordingly, in a first aspect, a system is provided for optimizing functionality of a radio tower comprising multiple radios. The system includes a first radio that transmits data to and receives data from mobile devices within a coverage area of the radio tower by way of an antenna and a second radio that only transmits data to the mobile devices within the coverage area of the radio tower by way of the antenna. Furthermore, the system includes one or more baseband units that process the data received at the first radio from the mobile devices within the coverage area of the radio tower and that transmit the data to the first radio and the second radio. The system also includes a combiner that combines a first quantity of channels corresponding to a first quantity of radio ports into a second quantity of channels that correspond to a second quantity of antenna ports, the radio ports being associated with the first radio and the second radio.

In a second aspect, a system is provided for optimizing functionality of a radio tower comprising multiple radios. The system includes a first radio of the radio tower that transmits data on a downlink and receives data on an uplink, a second radio of the radio tower that transmits data on the downlink but does not receive data on the uplink, and a first baseband unit corresponding to a first wireless communication technology. The first baseband unit is capable of receiving the data from the first radio but not from the second radio and transmitting the data to both the first radio and the second radio. The first baseband unit processes the received data. The system further includes a second baseband unit corresponding to a second wireless communication technology. The second baseband unit is capable of receiving the data from the first radio but not from the second radio and transmitting the data to both the first radio and the second radio, and the second baseband unit processing the received data.

In a third aspect, one or more computer-storage media having computer-executable instructions embodied thereon are provided that, when executed, perform a method for optimizing functionality of a radio tower comprising multiple radios. The method includes receiving, at a baseband unit associated with a first wireless communication technology, data on an uplink data transmission from a first radio but not from a second radio, the first radio and the second radio being located at the radio tower. Further, the method includes processing the data and transmitting the data on a downlink data transmission to the first radio and the second radio, wherein the first radio and the second radio have a combined quantity of radio ports whose channels are combined by way of a combiner to be equivalent to the quantity of antenna ports.

Referring to the drawings in general, and initially to FIG. 1 in particular, a block diagram of an illustrative communications device according to one embodiment is provided and referenced generally by the numeral 100. Although some components are shown in the singular, they may be plural. For example, communications device 100 might include multiple processors or multiple radios, etc. As illustratively shown, communications device 100 includes a bus 110 that directly or indirectly couples various components together including memory 112, a processor 114, a presentation component 116, a radio 117, input/output ports 118, input/output components 120, and a power supply 122.

Memory 112 might take the form of memory components previously described. Thus, further elaboration will not be provided here, only to say that memory component 112 can include any type of medium that is capable of storing information (e.g., a database). A database can be any collection of records. In one embodiment, memory 112 includes a set of embodied computer-executable instructions 112A that, when executed, facilitate various aspects disclosed herein. These embodied instructions will variously be referred to as "instructions" or an "application" for short.

Processor 114 might actually be multiple processors that receive instructions and process them accordingly. Presentation component 116 includes the likes of a display, a speaker, as well as other components that can present information (such as a lamp (LED), or even lighted keyboards).

Numeral 117 represents a radio(s) that facilitates communication with a wireless-telecommunications network. Illustrative wireless telecommunications technologies include CDMA, GPRS, TDMA, GSM, WiMax, LTE, and the like. In some embodiments, radio 117 might also facilitate other types of wireless communications including Wi-Fi communications and GIS communications. As can be appreciated, in various embodiments, radio 117 can be configured to support multiple technologies and/or multiple radios can be utilized to support a technology or multiple technologies.

Input/output port 118 might take on a variety of forms. Illustrative input/output ports include a USB jack, stereo jack, infrared port, proprietary communications ports, and the like. Input/output components 120 include items such as keyboards, microphones, speakers, touch screens, and any other item usable to directly or indirectly input data into communications device 100. Power supply 122 includes items such as batteries, fuel cells, or any other component that can act as a power source to power communications device 100.

By way of background, a base station, such as an eNodeB in an LTE telecommunications network is composed of, among other components, a baseband unit (BBU) that is connected to one or more remote radio units (RRUs), also termed radios. In turn, each RRU is typically connected directly to one or more antenna ports associated with an antenna located on the base station. In general, the BBU is responsible for, among other things, digital baseband signal processing. For instance, CDMA/EVDO and LTE Internet protocol (IP) packets are received from a wireless communications network and are digitally combined by the BBU. The blended digital baseband signal is then transmitted to the RRU. Digital baseband signals received from the RRU are demodulated by the BBU and the resulting IP packets are then transmitted by the BBU to the core network.

The RRU transmits and receives wireless RF signals. The RRU converts the blended digital signal received from the BBU into an analog RF output via a digital-to-analog (AD) converter. The analog signal is then amplified by an amplifier in the RRU and sent out for transmission to a mobile device via the antenna ports of the antenna. The RF signals received from the mobile device via the antenna ports are amplified by the RRU and converted to digital baseband signals for transmission to the BBU.

CDMA technology, for example, may utilize one transmit radio port and four receive radio ports (1T 4R), while LTE technology may utilize four transmit radio ports and four receive radio ports (4T 4R) or two transmit radio ports and four receive radio ports (2T 4R). In either scenario, it is most efficient to utilize as many receive radio ports as possible, such as four. As will be described herein, systems and methods are provided to maintain an increased quantity of radio ports that are able to receive data at any one time, thus increasing the receive diversity.

Figure 2:
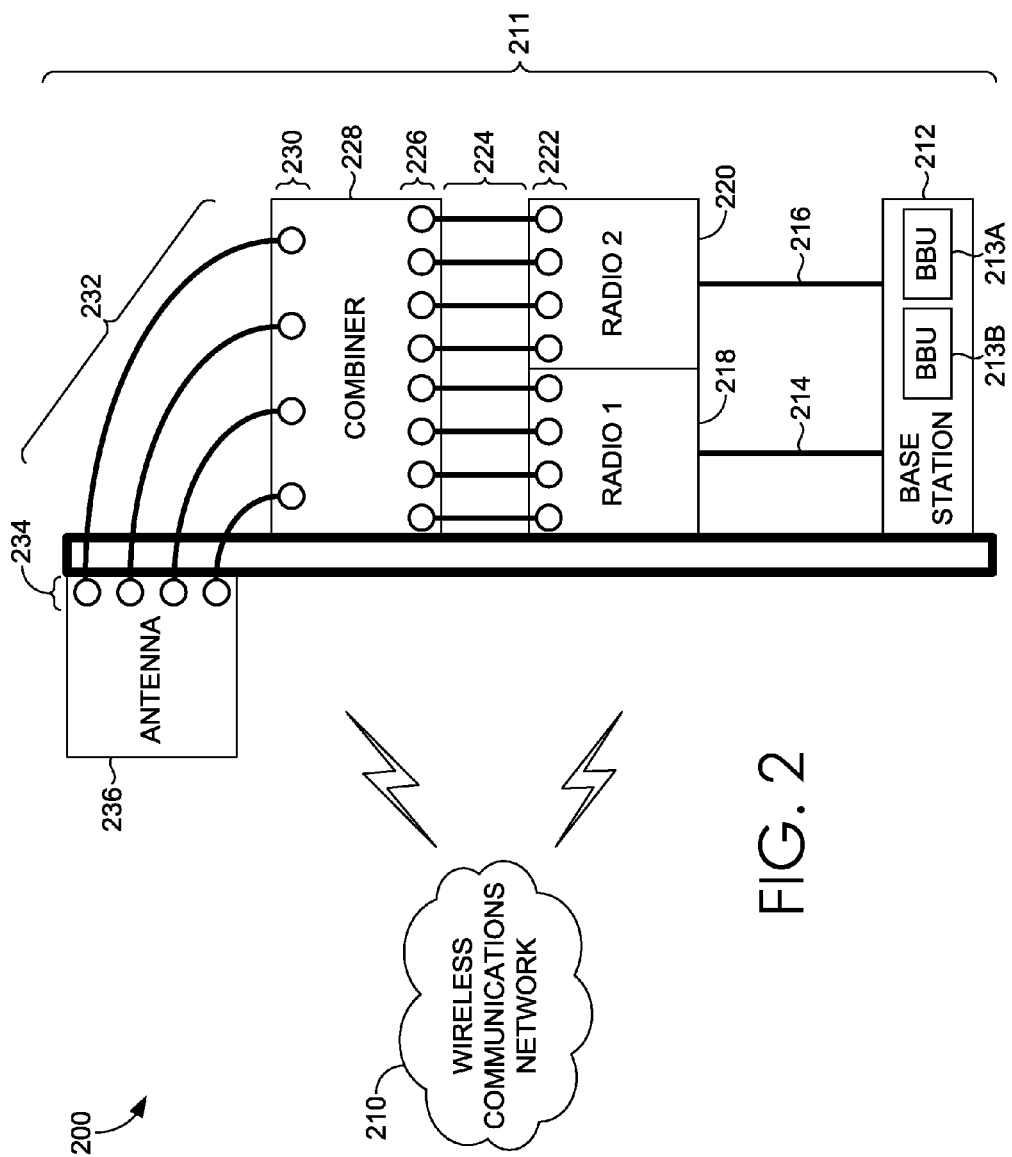
FIG. 2 depicts a diagram of a wireless communications network in communication with an exemplary radio tower.

Turning now to FIG. 2, an exemplary environment suitable for use in implementing embodiments of the present invention is illustrated and designated generally as environment 200. Environment 200 is but one example of a suitable environment and is not intended to suggest any limitation as to the scope of use or functionality of the invention. Neither should the environment be interpreted as having any dependency or requirement relating to any one or combination of components illustrated.

In the environment 200, a radio tower 211 is installed. A radio tower is typically a tall structure designed to support an antenna(s) for telecommunications and/or broadcasting. A radio tower is not intended herein to be limited to any shape and/or structure. For example, a radio tower 211 may be a building or pole on which a transmitting antenna is installed. In other embodiments, a mobile radio tower may be employed.

As illustrated in FIG. 2, the radio tower 211 includes or is associated with a base station 212, a radio 1 (218), a radio 2 (220), a combiner 228, and an antenna 236. In embodiments, base station 212 is a wireless communications station that is installed at a fixed location, such as near the base of the radio tower 211. In other embodiments, base station 212 is a mobile base station. The base station 212 is used to communicate as part of a wireless communications network 210. For example, base station 212 facilitates wireless communication between user devices and a network(s). A user device includes a device that uses a wireless communications network. A user device may take on a variety of forms, such as a personal computer (PC), a laptop computer, a tablet, a mobile phone, a personal digital assistant (PDA), a server, or any other device that is capable of communicating with other devices using a wireless telecommunications network. In one embodiment, a user device is the user device described in relation to FIG. 1 herein. Such a network might be a single network or multiple networks, as well as being a network of networks. A network(s) might comprise, for example, a cable network, an Intranet, the Internet, a wireless network (e.g., a wireless telecommunications network), or a combination thereof or portions thereof.

The base station 212 can communicate with the radio 1 (218) and the radio 2 (220), such as by way of BBU 213A and BBU 213B. In embodiments, multiple BBUs are comprised within the base station 212. For instance, if the radio tower 211 supports both CDMA and LTE technologies, a first BBU may support CDMA and a second BBU may support LTE. BBU 213A and 213B communicate, in some cases directly, with radio 1 (218) and radio 2 (220). In embodiments, one or both of radio 1 (218) and radio 2 (220) are transceivers or include transceivers configured to receive and transmit signals or data. However, in one embodiment, one of the radios (218 or 220) may be configured to receive and transmit signals or data, while the other radio is configured to only transmit signals or data, but not to receive signals or data. This embodiment will be described in more detail herein in regards to FIG. 3. In some embodiments, the radios (218 and 220) are integrated with the base station 212. In other embodiments, as illustrated in FIG. 2, the radios (218 and 220) are remote from the base station 212. In such an embodiment, the base station 212 can communicate with the radios (218 and 220), for example, using a data transmission path 214 or 216, such as a fiber optic cable.

Although the radios (218 and 220) are illustrated near the middle of the radio tower 211, as can be appreciated, the radios (218 and 220) can be installed in any number of locations and such an installation location is not intended to limit the scope of embodiments of the present invention. For example, the radios (218 and 220) can be installed at or near the bottom of the radio tower 211, in the center of the radio tower 211, at the top of the radio tower 211, integrated with the base station 212, or the like.

The radios (218 and 220) generally communicate with the antenna 236. In this regard, the radios (218 and 220) are used to transmit signals or data to the antenna 236 and receive signals or data from the antenna 236. Communications between the radios (218 and 220) and the antenna 236 can occur using any number of physical paths. A physical path, as used herein, refers to a path used for transmitting signals or data. As such, a physical path may be referred to as a radio frequency (RF) path, a coaxial cable path, cable path, or the like.

As such, each of the radios (218 and 220) includes one or more ports 222 used to connect one or more physical paths 224 to one or more ports 226 of the combiner 228. A combiner is used to consolidate signal paths or channels when, for example, a quantity of radio ports (such as when more than one radio is used) is greater than a quantity of antenna ports (e.g., eight radio ports to four antenna ports). To say it in a different way, the combiner 228 may be used to combine signals from two neighboring frequency bands onto a common output port. For instance, if two radios are utilized on the radio tower 211 and each radio has four ports, there would be eight total radio ports. Each of these radio ports is connected to the combiner, which combines or otherwise lessens the quantity of channels to match the number of ports on the antenna 236. While ports 226 are illustrated on the combiner 228, another type of input/output mechanism may be used, and is contemplated to be within the scope of the present invention.

Further, the combiner 228, in some embodiments, includes a guard band that is used to achieve isolation between neighboring frequency bands, and as such works to avoid interference between the various frequency ranges being utilized. In one embodiment, multiple guard bands are used, such as one guard band in between each frequency range to avoid interference. In the frequency range where the guard band is present, data may not be processed by the combiner or other component, and thus that data is considered to be noise and/or unusable. This data is ignored by the component processing the data. This may prevent one or more of the channels from being used at any given time, thus decreasing the transmit or receive diversity. As such, while the use of a guard band may be beneficial and even necessary in many circumstances, the use of guard bands may also limit data transmission, especially on the uplink. Even more, the use of guard bands may reduce the size of the combiner that is used in embodiments described herein. Embodiments of the present invention, as will be described further herein, provide for a greater diversity by eliminating a receive capability for one of the radios used in the radio tower 211.

As mentioned above, in one embodiment, not all of the radio ports 222 are configured to transmit and receive signals/data. For instance, in one embodiment, only four of the radio ports 222 are configured to both transmit and receive signals/data, while the other four of the radio ports 222 are configured to only transmit signals/data but not receive signals/data. As also mentioned, this provides for a great diversity when receiving signals/data from mobile devices by way of the antenna 236.

Once inputted into the combiner 228, the combiner consolidates or otherwise lessens the number of signals/channels to the quantity of antenna ports 234, and in one embodiment, combines signals from two neighboring frequency bands onto a common output port. As such, there are four combiner ports 230 illustrated that transport signals/data to/from the antenna 236 by way of physical links 232. For instance, a first port on the combiner 228 can connect a first physical path to a first port on the antenna 236, etc., while a first port 226 on the combiner can connect a first physical path to the radio (218 or 220), etc.

The antenna 236 is used for telecommunications. Generally, an antenna is an electrical device that converts electric power into radio waves and converts radio waves into electric power. The antenna 236 is typically positioned at or near the top of the radio tower 211. Such an installation location, however, is not intended to limit the scope of embodiments of the present invention.

Figure 3:
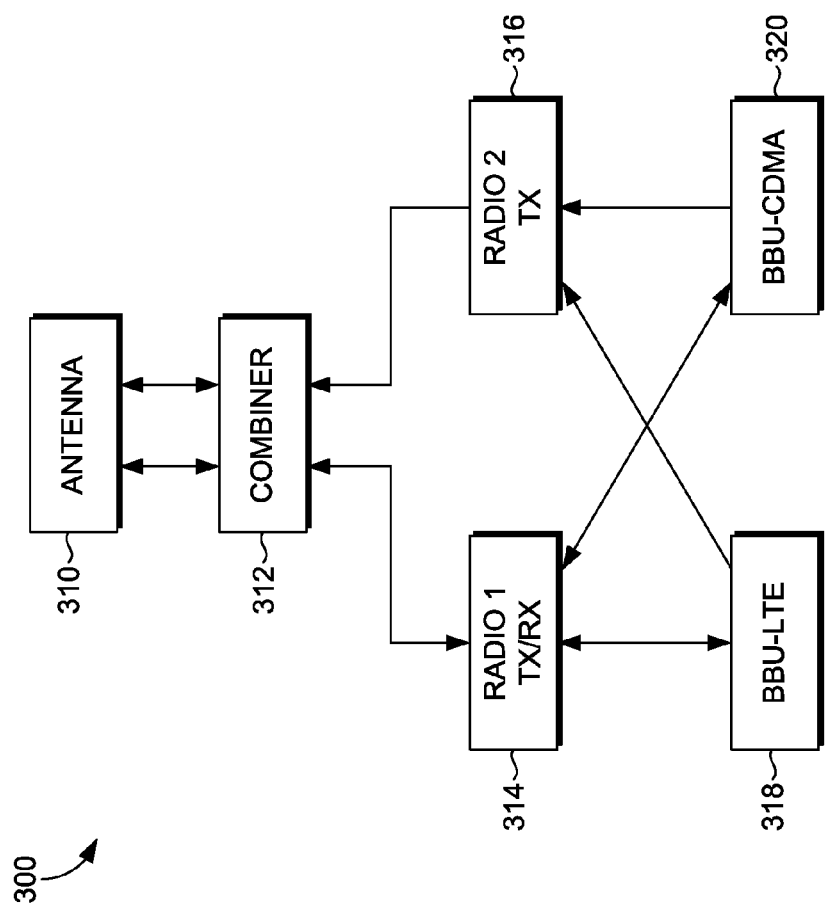
FIG. 3 depicts an exemplary block diagram utilized in embodiments of the present invention.

Turning now to FIG. 3, an exemplary block diagram 300 that is utilized in embodiments of the present invention is depicted. Initially, diagram 300 includes an antenna 310 which, as shown, is capable of bi-directional communication with the combiner 312. While two bi-directional arrows are illustrated between the antenna 310 and the combiner 312, these represent just the data/signals that are being transmitted back and forth, not of the actual signaling/data paths. For instance, the antenna 310, in one embodiment, has four antenna ports. As such, there may be four separate physical paths from the antenna 310 to the combiner 312. As mentioned herein, the combiner 312 may include one or more guard bands that are used to prevent or minimize interference between two frequency ranges.

The radio 1 (314), as shown, transmits and receives signals/data with the antenna 310 through the combiner 312, as indicated by TX/RX. As such, the radio 1 (314) is capable of bi-directional communication with the combiner 312. Radio 2 (316), however, only transmits, as indicated by TX, and thus is only able to transmit signals/data to the antenna 310 through the combiner 312, but is not capable of receiving any data. The reasons for the disablement of radio 2's (316) receive functionality, in one embodiment, is tied to the use of one or more guard bands in the combiner 312. As mentioned, the combiner 312, in one embodiment, includes a guard band that is used to achieve isolation between neighboring frequency bands, and as such works to avoid interference between the various frequency ranges being utilized. In one embodiment, multiple guard bands are used, such as one guard band in between each frequency range to avoid interference. In the frequency range where the guard band is present, data may not be processed by the combiner or other component, and thus that data is considered to be noise and/or unusable. As such, this data may be ignored by the component processing the data. This may prevent one or more of the channels from being used at any given time, thus decreasing the transmit or receive diversity. As such, while the use of a guard band may be beneficial and even necessary in many circumstances, the use of guard bands may also limit data transmission, especially on the uplink. Even more, the use of guard bands may reduce the size of the combiner that is used in embodiments described herein. Embodiments described herein provide for a greater receive diversity (e.g., higher quantity of radio ports that receive data at any one time), which results in better signal strength and higher data rates.

Because only radio 1 (314) receives signals/data from the combiner 312 on the uplink data transmission, only radio 1 (314) transmits data to the BBUs (318 and 320). In the embodiment illustrated in FIG. 3, BBU-LTE 318 is specifically designated as the BBU to process data when LTE technology is being used, and BBU-CDMA 320 is specifically designated as the BBU to process data when CDMA technology is being used. As such, radio 1 (314) may send data to BBU-LTE 318 and/or BBU-CDMA, while radio 2 (316), at least in this embodiment, does not have the capability of sending data to either BBU. The responsibilities of the BBUs are generally to manage IP traffic, timing functionality, and data processing, among others.

While radio 2 (316), in one embodiment, does not send signals/data to either BBU 318 or 320, radio 2 (316) does still have its transmit functionality, and thus is capable of receiving signals/data from the BBUs 318 and 320. The BBUs 318 and 320, as mentioned, receive all data from radio 1 (314) and process this data. Once it is processed, the BBUs 318 and 320 determine to which radio 314 or 316 the data is to be sent. This determination may be based on technology used (e.g., LTE or CDMA), channel availability, etc.

FIG. 4 depicts a flow diagram of an exemplary method for optimizing functionality of a radio tower comprising multiple radios, according to an embodiment of the technology. Initially, at step 410, data on an uplink data transmission is received from a first radio but not from a second radio. Disallowing receive functionality at the second radio may provide for a greater diversity in receiving the data from mobile devices within the coverage area by way of the antenna. In one embodiment, the data is received at a baseband unit associated with a first wireless communication technology (e.g., LTE or CDMA). The first radio and the second radio may both be located at the radio tower. In some cases, a second radio is utilized to increase capacity at the base station. The baseband unit may be associated with a particular wireless communications technology, such as, but not limited to, LTE or CDMA.

At step 412, the data, once received at a baseband unit, for instance, is processed. At step 414, the data is transmitted on a downlink data transmission to the first radio and the second radio, as the second radio may have transmitting capabilities but not receiving capabilities. In one instance, data is transmitted to/from the baseband unit by way of a common public radio interface (CPRI).

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. A system for optimizing functionality of a radio tower comprising multiple radios, the system comprising:
   a first radio that transmits data to and receives data from mobile devices within a coverage area of the radio tower by way of an antenna;
   a second radio that only transmits data to the mobile devices within the coverage area of the radio tower by way of the antenna;
   one or more baseband units that process data received at the first radio from the mobile devices within the coverage area of the radio tower and that transmits data to the first radio and the second radio, wherein at least one of the one or more baseband units is associated with CDMA;
   a second baseband unit corresponding to a second wireless communication technology, the second baseband unit capable of receiving data from the first radio but not from the second radio and transmitting data to both the first radio and the second radio, and the second baseband unit processing received data; and
   a combiner that combines a first quantity of channels corresponding to a first quantity of radio ports into a second quantity of channels that correspond to a second quantity of antenna ports, the radio ports being associated with the first radio and the second radio.

2. The system of claim 1, further comprising the antenna.

3. The system of claim 1, wherein a first of the one or more baseband units is associated with LTE.

4. The system of claim 1, wherein there are eight radio ports and four antenna ports.

5. The system of claim 1, wherein the combiner includes a guard band to avoid interference from adjacent channels.

6. The system of claim 1, wherein greater diversity is achieved by allowing only the first radio to receive data from the mobile devices by way of the antenna.

7. The system of claim 6, wherein the greater diversity produces higher signal strength and higher data rates for the mobile devices that are served by the radio tower.

8. The system of claim 1, wherein both the first radio and second radio are both connected to each of the first and the second of the one or more baseband units.

9. The system of claim 1, wherein each of the first radio and second radio has one or more CDMA channels and one or more LTE channels.

10. A system for optimizing functionality of a radio tower comprising multiple radios, the system comprising:
    a first radio of the radio tower that transmits data on a downlink and receives data on an uplink;
    a second radio of the radio tower that transmits data on the downlink but does not receive data on the uplink;
    a first baseband unit corresponding to a first wireless communication technology, the first baseband unit capable of receiving data from the first radio but not from the second radio and transmitting data to both the first radio and the second radio, and the first baseband unit processing received data; and
    a second baseband unit corresponding to a second wireless communication technology, the second baseband unit capable of receiving data from the first radio but not from the second radio and transmitting data to both the first radio and the second radio, and the second baseband unit processing received data.

11. The system of claim 10, wherein the first wireless communication technology is LTE and the second wireless communication technology is CDMA.

12. The system of claim 10, further comprising a combiner for combining channels such that a quantity of the channels from radio ports of the first radio and the second radio is equivalent to a quantity of antenna ports associated with an antenna of the radio tower.

13. The system of claim 12, wherein the combiner includes a guard band to avoid interference from adjacent channels.

14. The system of claim 10, wherein the first radio transmits data to one or more of the first baseband unit or the second baseband unit based on an associated wireless communication technology.

15. One or more non-transitory computer-storage media having computer-executable instructions embodied thereon that, when executed, perform a method for optimizing functionality of a radio tower comprising multiple radios, the method comprising:
    receiving, at a first baseband unit associated with a first wireless communication technology, data on an uplink data transmission from a first radio but not from a second radio, the first radio and the second radio being located at the radio tower, wherein the second radio is configured to transmit a downlink data transmission and further configured not to receive data on the uplink data transmission;
    receiving, at a second baseband unit associated with a second wireless communication technology, data on the uplink data transmission from the first radio but not from the second radio and transmitting data to both the first radio and the second radio;
    processing received data at the first and second base units; and
    transmitting data on the downlink data transmission to the first radio and the second radio, wherein the first radio and the second radio have a combined quantity of radio ports whose channels are combined by way of a combiner to be equivalent to a quantity of antenna ports.

16. The media of claim 15, wherein the baseband unit transmits and receives data to and from the first radio and the second radio utilizing a common public radio interface (CPRI).

17. The media of claim 15, wherein the first wireless communication technology is LTE.

18. The media of claim 15, wherein the first wireless communication technology is CDMA.

19. The media of claim 15, wherein not allowing the uplink data transmission from the second radio provides for a greater diversity in receiving data from mobile devices within a coverage area of the radio tower by way of an antenna.

* * * * *